Jan. 10, 1967 L. B. GRAY 3,297,011
PRESERVATION SYSTEM FOR ENGINES
Filed Feb. 2, 1965
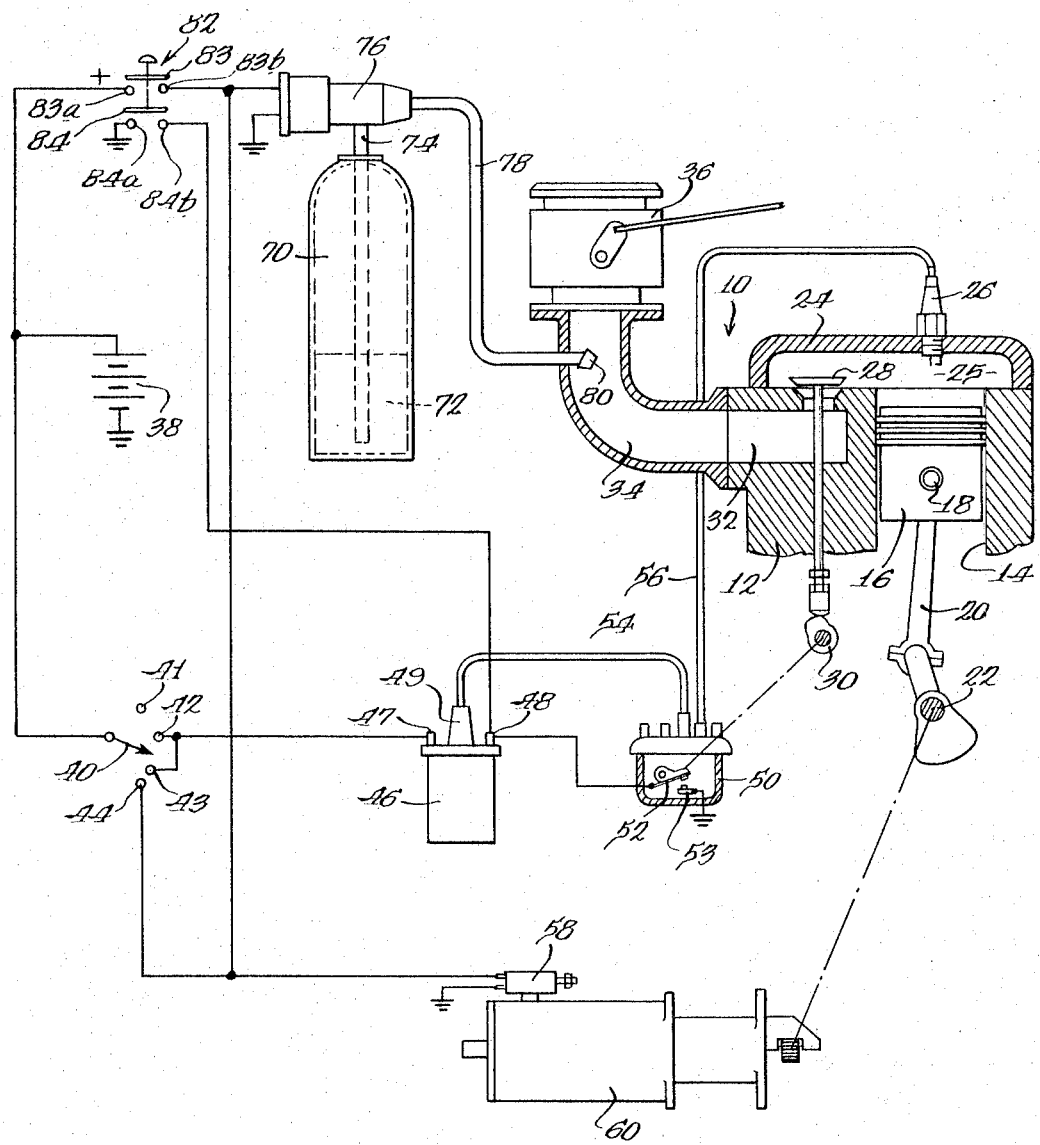
Inventor
Lysle B. Gray
By Hofgren, Wegner,
Allen, Stellman & McCord Attys 3,297,011
PRESERVATION SYSTEM FOR ENGINES
Lysle B. Gray, Baltimore, Md., assignor to Brunswick Corporation, a corporation of Delaware
Filed Feb. 2, 1965, Ser. No. 429,834
10 Claims. (Cl. 123—198)

This invention relates to systems for protecting internal combustion engines from undue wear caused by corrosion during extended idle periods. More specifically, protection of marine engines is of particular concern.

The operation of marine engines, especially those used in pleasure boats, is characterized by short periods of use separated by relatively long periods of idleness. The typical pleasure boat engine is operated for about eight hours during a week end and then is allowed to sit idle until the following week end. During this prolonged period of idleness, the combustion chamber of one or more cylinders is very likely to be exposed to the atmosphere through an open exhaust or intake valve. Accordingly, moisture laden air, and even salt spray, if the boat is located on a salt water body, have access to the unprotected metal walls of the combustion chambers of the engine through either the exhaust lines or the carburetor. The resulting corrosion of the cylinder walls can be severe.

Upon subsequent restarting of the engine at the end of the prolonged idle period, the piston rings scrape the corrosion off the cylinder walls. The residue contributes to the fouling of the piston rings. Additionally, the abrasive nature of the corrosion causes additional metal to be worn off the cylinder walls thus reducing the life of the engine. Furthermore, the force required to move the piston rings across the corroded walls of the cylinders during starting may be sufficiently great such that a weak battery will not be able to crank the engine to start the latter.

Accordingly, it is the principal object of the invention to provide means for preserving engines during idle periods thereof.

More specifically, it is an object of the invention to provide means for injecting a preservative agent into the combustion chamber of an engine.

Another object of the invention is the provision of means for injecting the preservative agent into the combustion chamber of an engine while the engine is being cranked to distribute the preservative agent evenly about the walls of the combustion chamber.

Another object of the invention is the provision of means for injecting a preservative agent into the combustion chamber of an engine during the cranking thereof and including means for disabling the ignition of the engine during such injection to preclude the starting thereof and the resulting burning off of the preservative agent.

Another object of the invention is the provision of means for injecting a preservative agent into the combustion chamber of an engine during the cranking thereof and means for disabling the ignition of the engine to preclude the starting thereof during the injection of the preservative agent wherein the various means operate in such a manner independently of the position of the engine ignition switch.

Another object of the invention is the provision of a system for preserving internal combustion engines that can be supplied in kit form to the user and easily installed on an existing engine.

Other features and advantages of the invention will become apparent from the following detailed specification taken in conjunction with the drawing, in which:

The figure is an overall view of an embodiment of the invention installed on an internal combustion engine shown in section.

A four-cycle combustion engine that is conventional in all respects is generally designated 10. The engine comprises a block 12 having at least one cylinder 14 bored therein. A suitable piston 16 is within the cylinder 14 and is connected by a wrist pin 18 to a connecting rod 20, which, in turn, is pivotally connected to a crankshaft 22. A head 24 is mounted on a block 12 in a conventional manner and is shaped in such a way as to form a combustion chamber 25 with the cylinder 14 and the block 12. A suitable spark plug 26 is received within the head 24 in such a manner as to project into the combustion chamber for igniting fuel mixtures therein.

Valves, such as the intake valve 28, are operated in a conventional sequence by a cam shaft 30 which is responsive to the position of the crankshaft 22 and thus the piston 16, and permit or preclude communication between the combustion chamber 25 and the valve port 32 in a well-known manner. As shown in the drawing, the port 32 comprises an intake port which is in communication with an intake manifold 34. The intake manifold 34, of course, interconnects a conventional carburetor 36 with the intake port 32.

A battery 38 has one terminal grounded and the other connected to a three-position ignition switch 40. The ignition switch 40 is provided with an open first contact 41 which corresponds to an "off" position. A second contact 42 is provided and corresponds to an "on" position. Third and fourth contacts 43 and 44, respectively, are also provided and correspond to a "starting" position of the ignition switch 40.

The second contact 42 is connected to one terminal 47 of the primary winding (not shown) of an ignition coil 46. The ignition coil 46 additionally has a second terminal 48 which serves as a common terminal for both the primary and secondary windings (not shown) of the ignition coil. Additionally, a high voltage terminal 49, which is connected to the opposite side of the secondary winding (not shown), is provided. The common terminal 48 is connected to a conventional breaker switch 52 which has a grounded contact 53. The breaker switch 52 is part of a conventional distributor 50 and is opened and closed by virtue of a conventional connection with the cam shaft 30. A high voltage lead 54 connects the terminal 49 with the distributor 50 and by means of a conventional rotor arrangement (not shown), the high voltage from the coil 46 is directed by a lead 56 to the spark plug in a proper time sequence.

The third and fourth contacts 43 and 44 of the ignition switch 40 are grouped but not directly connected such that upon movement of the switch blade 40 to the "starting" position, an electrical connection is made with both of the cotnacts 43 and 44. The contact 43 is connected in parallel with the contact 42 and when the ignition switch 40 is moved to the "starting" position, the ignition coil may receive current through the contact 43. The contact 44 is connected to a conventional solenoid relay 58 for a cranking or starting motor 60 which rotates the engine crankshaft 22 by means of conventional construction to crank the engine and start the latter.

The construction thus far described is wholly conventional, it being that ordinarily found on any multi-cylinder, four-cycle, internal combustion engine. It is, therefore, set forth solely for illustrative purposes, it being understood that the invention is susceptible to use with virtually every type of internal combustion engine regardless of the number of cylinders, cycles, etc.

The construction of an exemplary form of an engine preservation means, according to the invention, is as follows. There is provided a pressure vessel 70 capable of holding a supply of any preservative agent, such as a preservative oil 72, for use in the engine 10. While it is not critical, it is preferred that the pressure vessel 70 be a conventional aerosol can containing preservative oil under pressure. In this manner, the refilling of the preservation system is greatly simplified and is not a messy operation, thereby permitting the operator of the engine, who need not be a skilled mechanic, to perform the refilling operation.

A conduit 74 connects the pressure vessel 70 with a normally closed, solenoid operated valve 76. The solenoid valve 76 is then connected by another conduit 78 to a spray nozzle 80 placed in the engine intake manifold 34. Thus, it will be apparent that when the valve 76 is opened by virtue of the actuation of its solenoid operator, the pressure in the vessel 70 above the preservative oil 72 will force the latter into the conduit 74, through the valve 76, the conduit 78 and to the spray nozzle 80 where it will be discharged into the intake manifold 34 in the form of a spray. It will be recognized that the placement of the nozzle 80 is not limited to a position within the intake manifold but could be placed in an intake port or even in the combustion chamber itself.

To selectively actuate the solenoid valve 76, there is provided a double pole single throw normally open switch generally designated 82. The switch 82 comprises a first bridging blade 83 arranged to bridge contacts 83a and 83b to permit current to flow therebetween, and a second bridging blade 84 which is arranged to bridge contacts 84a and 84b to permit current to flow therebetween. The contact 83a is connected to the battery 38, while the contact 83b is connected to the solenoid valve 76 and to the starting solenoid relay 58. The contact 84a is grounded while the contact 84b is connected to the terminal 48 of the ignition coil 46. Thus, when the switch 82 is closed, current will flow from the battery 38 through the contact 83a, the bridging blade 83, and the contact 83b to the solenoid valve which will then be opened, and to the starting solenoid relay 58 which will energize the starting motor 60. Simultaneously therewith, the breaker switch 52 of the distributor 50 will be shunted through the contact 84b, the bridging blade 84, and the contact 84a. Since the ignition coil 46 is essentially a transformer, and since its power supply is a D.C. source, here the battery 38, the shunting of the breaker switch 52 through the switch elements 84, 84a, 84b precludes the setting up of a changing magnetic field within the coil 46 by the action of the breaker switch 52, and no current will be induced in the secondary winding of the coil 46. Thus, there will be no source of high ignition voltage for firing the spark plug 26. Accordingly, the ignition is effectively disabled. If it is desired to use a form of the invention in conjunction with a magneto fired engine, it will be appreciated that through suitable construction of the switch 82, the shorting action of the blade 84 can be used to shunt the magneto directly.

The energization of the starting motor 60, coupled with the disabling of the ignition system, causes the valves 28 to be opened and closed in their proper sequence and the piston 16 to be moved up and down within the cylinder 14. Accordingly, the spray of preservative oil in the intake manifold 34 is drawn through the intake port 32, past the valve 28 (assuming it is opened at this point during the cranking of the engine) and into the combustion chamber 25. Once in the combustion chamber 25, the preservative oil 72 will settle on the various walls thereof to coat the latter and will additionally be distributed upon the cylinder walls 14 by the action of the moving piston 16. Accordingly, the walls of the combustion chamber 25 will be coated with preservative oil which will thereby preclude corrosion due to exposure to a moisture laden and/or salt spray atmosphere.

While engine preserving means according to the invention are ideally suited for pleasure boat engines, it will be apparent that such means do not have their utility restricted thereto and may be of substantial benefit when used in conjunction with internal combustion engines in other applications.

Because of the simplicity of the invention, it will be appreciated that various forms thereof are readily adaptable to existing engines. For example, forms of the invention may be sold in kits comprising the switch 82, the solenoid valve 76, the conduits 74 and 78, the pressure vessel 70, the spray nozzle 80 and the various electrical leads necessary to connect the device on an existing engine electrical system.

It will be further apparent that an engine preserving system according to the invention will operate properly regardless of the position of the engine ignition switch. The engine ignition system will be disabled whether or not the ignition switch is in an "off" position, an "on" position, or a "starting" position. Furthermore, the starting motor will be energized to spread the preservative oil on the cylinder walls irrespective of whether it is energized through the ignition switch in "starting" position.

Having described a specific embodiment of my invention in accordance with 35 U.S.C. 112, I do not wish to be limited to the construction set forth, but rather, to have the invention construed in accordance with its true spirit as set forth in the following claims.

I claim:

1. An internal combustion engine comprising an engine block having at least one combustion chamber therein, a piston within said combustion chamber, intake manifold means associated with said combustion chamber, ignition means for igniting fuel within said combustion chamber and including a coil connected to one side of a source of electrical power, electrical pulsing means connected to said coil and to the other side of said source of electrical power, said pulsing means including means responsive to the position of said piston within said combustion chamber for actuating said pulsing means; motor means for cranking said engine, and an engine preservation control means comprising: means for holding preservative oil under pressure, a spray nozzle in said intake manifold means, a normally closed valve having an electric operator, first conduit means connecting said nozzle to said valve, second conduit means connecting said holding means and said valve whereby when said valve is opened, preservative oil will pass from said holding means to said nozzle to be sprayed therefrom, a double pole single throw normally open switch, shunting means including one pole of said switch connected across said electrical pulsing means, and circuit means including the other pole of said switch for connecting said electric valve operator and said motor means across said source of electrical power whereby when said switch is closed said ignition means is disabled, said valve is opened to admit preservative oil into said intake manifold means and said motor means cranks said engine to draw preservative oil from said manifold into said combustion chamber to preclude rusting and corrosion within the latter.

2. An internal combustion engine comprising an engine block having at least one combustion chamber therein, a piston within said combustion chamber, ignition means for igniting fuel within said combustion chamber and including means responsive to the position of said piston within said combustion chamber for actuating said ignition means; motor means for cranking said engine, and an engine preservation control means comprising: means for holding preservative oil, preservative oil injecting means in communication with said combustion chamber, a valve having an electric operator, conduit means including said valve and connecting said injecting means to said holding means whereby when said valve is opened, preservative oil may pass from said source to said injecting means to be released therefrom, switch means including two poles, means including one pole of said switch means for disabling said ignition means, and circuit means including the other pole of said switch for connecting said electric valve operator and said motor means across a source of electric power whereby when said switch is closed said ignition means is disabled, said valve is opened to permit preservative oil to flow into said engine and said motor means cranks said engine to draw preservative oil into said combustion chamber to preclude rusting and corrosion within the latter.

3. An internal combustion engine comprising an engine block having at least one combustion chamber therein, a piston within said combustion chamber, ignition means for igniting fuel within said combustion chamber and including means responsive to the position of said piston within said cylinder for actuating said ignition means, and an engine preservation control means comprising: means for holding preservative oil, a spray nozzle in communication with said combustion chamber, a valve having an electric operator, conduit means including said valve and connecting said nozzle to said holding means whereby when said valve is opened, preservative oil may pass from said holding means to said nozzle to be sprayed therefrom, switch means including two poles, means including one pole of said switch means for disabling said ignition means, and circuit means including the other pole of said switch means for connecting said electric valve operator across a source of electrical power whereby when said switch means is closed said ignition means is disabled, said valve is opened to permit preservative oil to flow into said engine to preclude rusting and corrosion within the latter.

4. An internal combustion engine comprising an engine block having at least one combustion chamber therein, a piston within said combustion chamber, ignition means for igniting fuel within said combustion chamber and including means responsive to the position of said piston within said combustion chamber for actuating said ignition means; motor means for cranking said engine, and an engine presevation control means comprising: means for holding preservative oil, a spray nozzle in said engine, a valve having an electric operator, conduit means including said valve and connecting said nozzle to said holding means whereby when said valve is opened, preservative oil may pass from said holding means to said nozzle to be sprayed therefrom, a switch, and circuit means including said switch for connecting said electric valve operator and said motor means across a source of electrical power and at the same time disabling the ignition means whereby when said switch is closed, said valve is opened to permit preservative oil to flow into said engine and said motor means cranks said engine to draw preservative oil into said combustion chamber to preclude rusting and corrosion within the latter.

5. An engine preservation control means comprising: means for holding preservative oil under pressure, a spray nozzle adapted to be placed in an engine intake manifold, a normally closed valve having an electric operator, first conduit means connecting said nozzle to said valve, second conduit means connecting said oil source and said valve whereby when said valve is opened, preservative oil will pass from said holding means to said nozzle to be sprayed therefrom, a double pole single throw normally open switch, shunting means including one pole of said switch for connection across an electrical pulsing means in an engine ignition circuit, and circuit means including the other pole of said switch for connecting said electric valve operator and an engine cranking motor across a source of electrical power whereby when said preservation control means are placed on an engine and said switch is closed, the engine ignition will be disabled, said valve will be opened to admit preservative oil into the engine intake manifold and the engine cranking motor will crank said engine to draw preservative oil from said manifold into the engine to preclude rusting and corrosion within the latter.

6. An engine preservation control means comprising: means for holding preservative oil, preservative oil injecting means adapted to be placed in communication with a combustion chamber, a valve having an electric operator, conduit means including said valve and connecting said injecting means and said holding means, whereby when said valve is opened, preservative oil may pass from said holding means to said injecting means to be released therefrom, switch means including two poles, means including one pole of said switch means for disabling an engine ignition circuit, and circuit means including the other pole of said switch means for connecting said electric valve operator and an engine cranking motor across a source of electrical power whereby when said preservation control means are placed on an engine and said switch means is closed, the engine ignition will be disabled, said valve will be opened to admit preservative oil into the engine and the engine cranking motor will crank said engine to draw preservative oil into the combustion chamber to preclude rusting and corrosion within the latter.

7. An engine preservation control means comprising: means for holding preservative oil under pressure, a spray nozzle adapted to be placed in communication with a combustion chamber, a valve having an electric operator, conduit means including said valve and connecting said nozzle and said holding means, whereby when said valve is opened, preservative oil will pass from said holding means to said nozzle to be sprayed therefrom, switch means including two poles, means including one pole of said switch for disabling an engine ignition circuit, and circuit means including the other pole of said switch for connecting said electric wire valve operator across a source of electrical power whereby when said preservation control means are placed on an engine and said switch is closed, the engine ignition will be disabled and said valve will be opened to admit preservative oil into the engine to preclude rusting and corrosion within the latter.

8. An engine preservation control means comprising: means for holding preservative oil under pressure, a spray nozzle adapted to be placed in communication with a combustion chamber, a valve having an electric operator, conduit means including said valve and connecting said nozzle and said holding means whereby when said valve is opened, preservative oil will pass from said holding means to said nozzle to be sprayed therefrom, a switch, and circuit means including said switch for connecting said electric valve operator and an engine cranking motor across a source of electrical power whereby when said preservation control means are placed on an engine and said switch is closed, said valve will be opened to admit preservative oil into the engine and the engine cranking motor will crank said engine to distribute preservative oil within the engine to preclude rusting and corrosion within the latter.

9. An engine preservation control means comprising: means for holding preservative oil, a spray nozzle adapted to be placed in communication with a combustion chamber, conduit means connecting said nozzle and said holding means, said conduit means including power operated means for causing preservative oil to flow in said conduit whereby when said power operated means is actuated, preservative oil will pass from said holding means to said nozzle to be sprayed therefrom, actuating means, and power transmitting means including said actuating means for connecting said power operated means and an engine cranking motor to a source of power whereby when said preservation control means are placed on an engine and said actuating means is activated, said power operated means will be actuated to admit preservative oil into the engine and the engine cranking motor will crank said engine to distribute preservative oil within the combustion chamber to preclude rusting and corrosion within the latter, and means for disabling an engine ignition circuit when the actuating means is actuated.

10. An engine preservation system comprising, a source of preservative oil, a spray nozzle connected to said source and positionable to deliver oil to a combustion chamber, means for causing the flow of oil to said nozzle and means operable simultaneously with said oil flow means for cranking of the engine and disabling the ignition of the engine.

References Cited by the Examiner
UNITED STATES PATENTS

| | | | |
|---|---|---|---|
| 1,157,533 | 10/1915 | Harris | 123—179 |
| 1,296,922 | 3/1919 | Clairmont | 123—198 |
| 2,679,837 | 6/1954 | Tyler | 123—180 |
| 2,881,748 | 4/1959 | Foddy et al. | 123—180 |

OTHER REFERENCES

"The Complete Boating Encyclopedia," Golden Press, New York, Copyright 1964, Library of Congress Catalogue Card Number 64—11589, Patent Office Library Catalogue Number GV 775 W4, pages 270, 276, and 503.

MARK NEWMAN, *Primary Examiner.*

W. E. BURNS, *Assistant Examiner.*